United States Patent
Lee et al.

(10) Patent No.: US 9,600,088 B2
(45) Date of Patent: Mar. 21, 2017

(54) METHOD AND APPARATUS FOR DISPLAYING A POINTER ON AN EXTERNAL DISPLAY

(71) Applicant: Samsung Electronics Co., Ltd., Gyeonggi-do (KR)

(72) Inventors: Jun-Hui Lee, Gyeongsangbuk-do (KR); Jin-Man Kim, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 306 days.

(21) Appl. No.: 14/167,258

(22) Filed: Jan. 29, 2014

(65) Prior Publication Data

US 2014/0210713 A1 Jul. 31, 2014

(30) Foreign Application Priority Data

Jan. 31, 2013 (KR) .......................... 10-2013-0011356

(51) Int. Cl.
*G06F 3/03* (2006.01)
*G06F 3/0488* (2013.01)
(Continued)

(52) U.S. Cl.
CPC .............. *G06F 3/03* (2013.01); *G06F 3/0488* (2013.01); *G06F 3/1454* (2013.01); *G06F 9/4445* (2013.01); *G09G 5/08* (2013.01)

(58) Field of Classification Search
CPC .... G06F 3/0414; G06F 3/0488; G06F 3/1454; G06F 2203/04101
See application file for complete search history.

(56) References Cited

U.S. PATENT DOCUMENTS 9,223,493 B2* 12/2015 Cho .................... G06F 3/03547
2002/0057263 A1* 5/2002 Keely ................. G06F 3/04883
345/179
(Continued)

FOREIGN PATENT DOCUMENTS

EP 1 990 707 A1 11/2008
EP 2 333 650 A2 6/2011
(Continued)

*Primary Examiner* — Larry Sternbane
(74) *Attorney, Agent, or Firm* — Cha & Reiter, LLC

(57) ABSTRACT

The present invention relates to a method of displaying a pointer on an external device sharing an output video with a terminal, and an apparatus thereof. A method of controlling display of a pointer by a terminal so that the pointer is displayed on an external device according to an embodiment of the present invention includes transmitting an output video of the terminal to the external device, if a predetermined request exists; detecting a sensing value according to a input performed on a display area; generating a pointer displaying signal used for displaying a pointer at a position corresponding to a position where the detected sensing value is detected on the external device based on the detected sensing value; and transmitting the generated pointer displaying signal to the external device. According to the present invention, since a pointer is displayed on an external device sharing an output video with a terminal, the user may execute a desired function by looking at the external device, without looking at the terminal.

25 Claims, 15 Drawing Sheets

(51) Int. Cl.
*G06F 3/14* (2006.01)
*G09G 5/08* (2006.01)
*G06F 9/44* (2006.01)

(56) References Cited

U.S. PATENT DOCUMENTS

| | | | |
|---|---|---|---|
| 2003/0025678 A1* | 2/2003 | Lee | G06F 3/0488 |
| | | | 345/173 |
| 2005/0071761 A1 | 3/2005 | Kontio | |
| 2008/0170164 A1 | 7/2008 | Park | |
| 2008/0273015 A1* | 11/2008 | Huang | G06F 3/0416 |
| | | | 345/173 |
| 2010/0017710 A1* | 1/2010 | Kim | G06F 3/0414 |
| | | | 715/702 |
| 2011/0181520 A1 | 7/2011 | Boda et al. | |
| 2012/0274547 A1 | 11/2012 | Raeber et al. | |
| 2013/0027315 A1* | 1/2013 | Teng | G06F 3/0488 |
| | | | 345/173 |
| 2013/0147793 A1* | 6/2013 | Jeon | G06F 3/011 |
| | | | 345/419 |
| 2013/0222224 A1* | 8/2013 | Eriksson | G06F 3/1423 |
| | | | 345/156 |
| 2013/0246970 A1* | 9/2013 | Helle | G06F 3/0482 |
| | | | 715/822 |
| 2014/0139431 A1* | 5/2014 | Tseng | G06F 3/0488 |
| | | | 345/158 |

FOREIGN PATENT DOCUMENTS

| | | |
|---|---|---|
| KR | 10-2008-0066379 A | 7/2008 |
| KR | 10-2011-0135837 A | 12/2011 |
| KR | 10-1212364 B1 | 12/2012 |

* cited by examiner

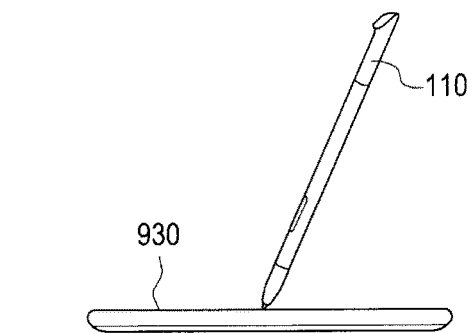
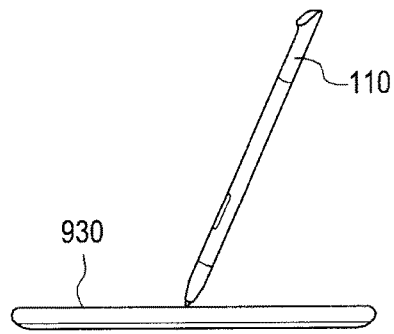
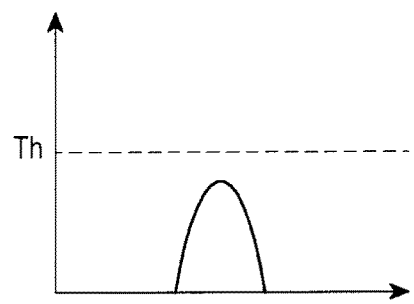
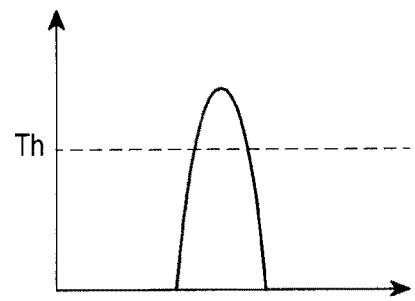
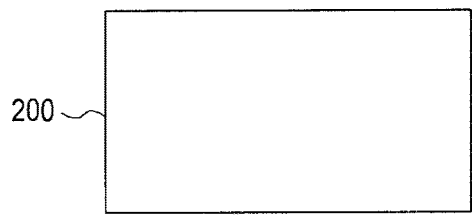
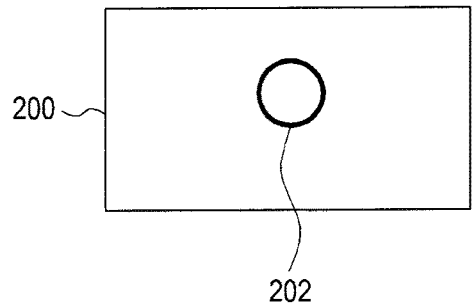
FIG.10CFIG.10D

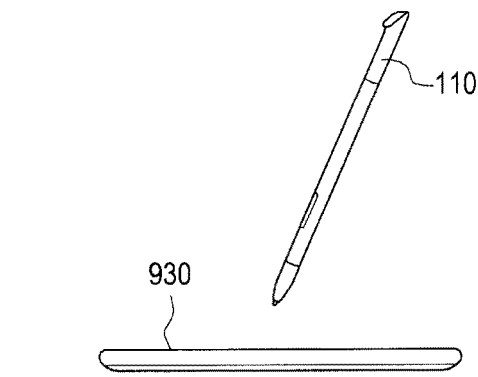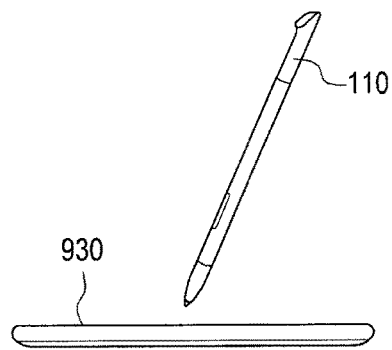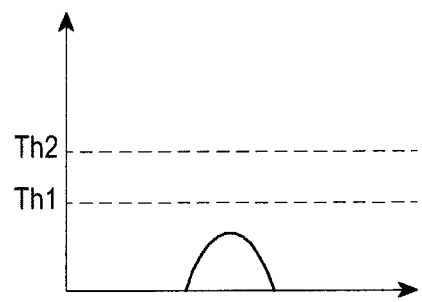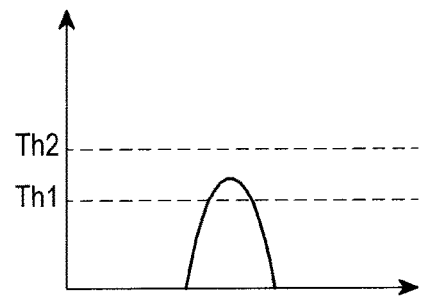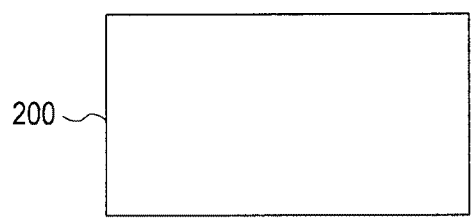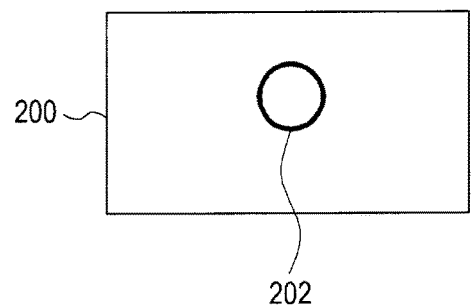
FIG.11A  FIG.11B

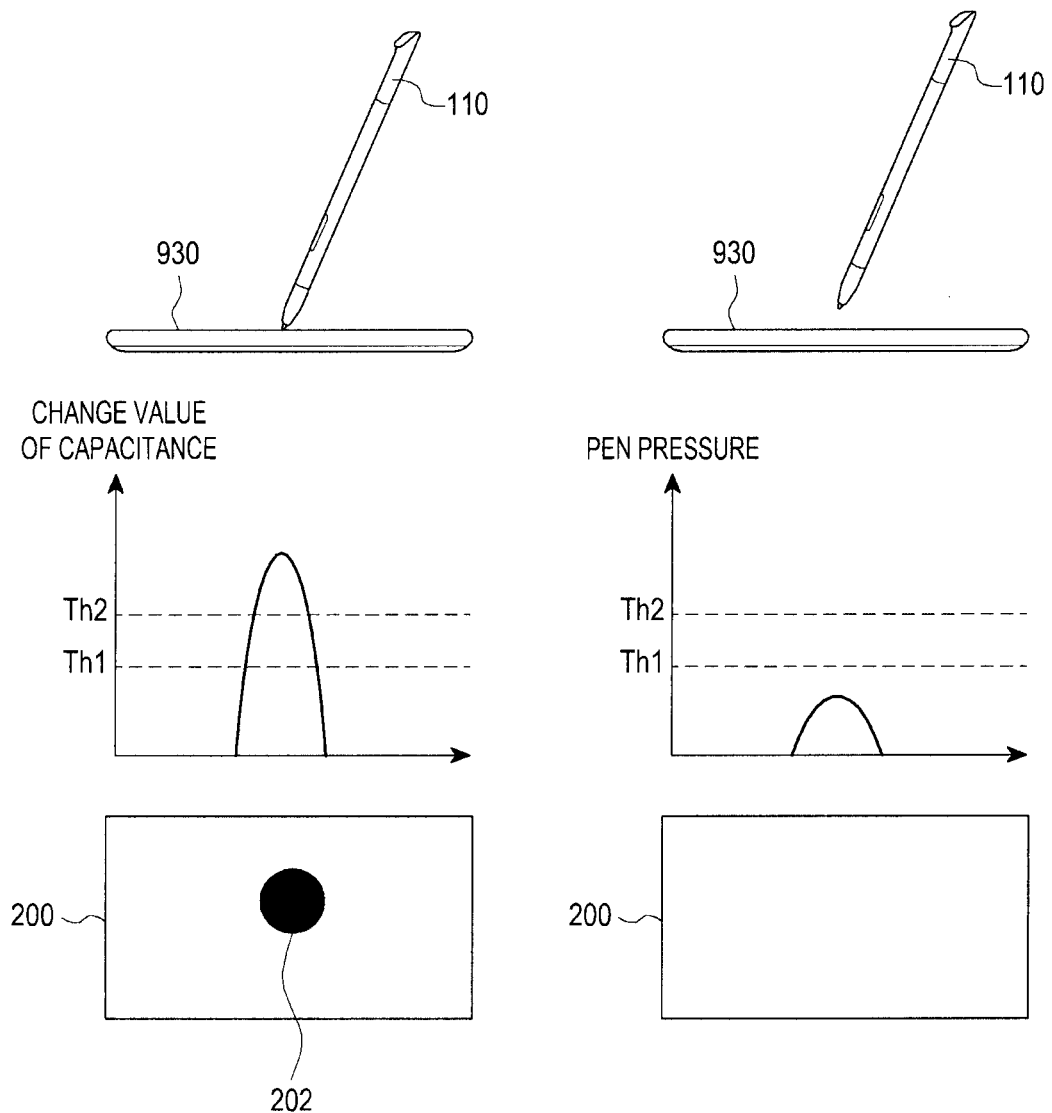

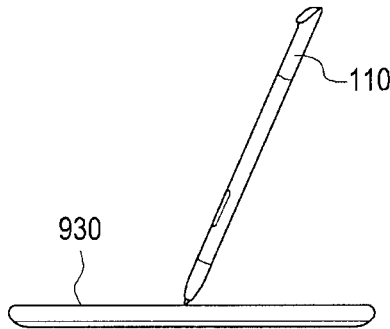 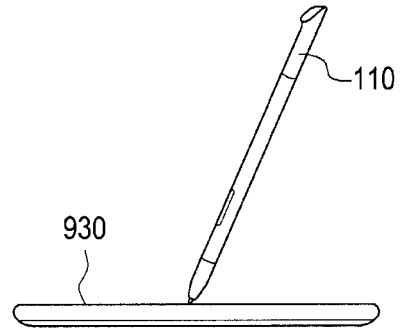
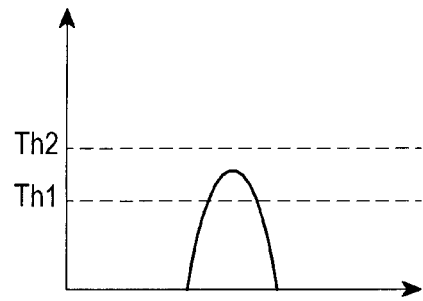 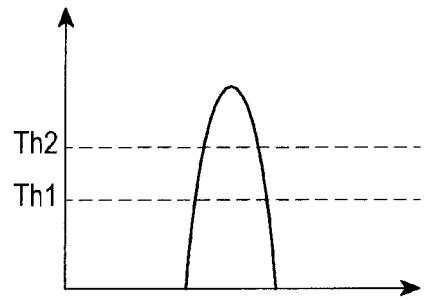
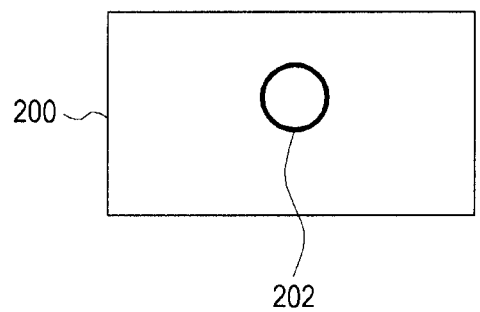 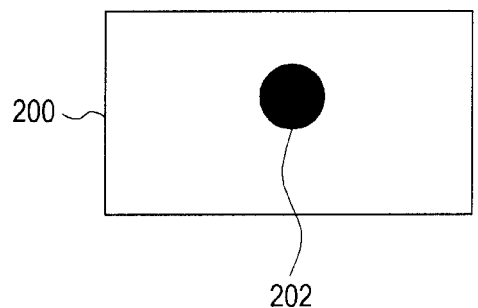
FIG.11E  FIG.11F

METHOD AND APPARATUS FOR DISPLAYING A POINTER ON AN EXTERNAL DISPLAY

CROSS RELATED APPLICATION

This application claims the benefit of priority under 35 U.S.C. §119(a) to Korean Application Serial No. 10-2013-0011356, which was filed in the Korean Intellectual Property Office on Jan. 31, 2013, the entire content of which is hereby incorporated by reference.

BACKGROUND

1. Field

The present disclosure relates to a method of displaying a pointer on an external device sharing an output video with a terminal, and an apparatus thereof.

2. Description of the Related Art

According to the recent development of multimedia technologies, various terminals such as smart phones are widely distributed, and such terminals are equipped with various applications that output videos.

Further, the development of the communication technologies enables the terminals to communicate with various external devices such as monitors, and accordingly the terminals and monitors are capable of sharing output videos.

In order to share the output videos like this, communication technologies such as MHL (Mobile High-definition Link) and Wi-Fi P2P (Peer to Peer) have been used. More particularly, a terminal and the external device may share the output videos using various communication technologies as described above. The sharing of the output video provides convenience for a user for watching a video, by enabling the video output in the terminal in a relatively small size to be output to a larger screen, e.g., monitor.

Meanwhile, while the output video is shared, if a user executes an application existing at a specific position or selects a button to which a specific function is assigned, the user may perform an operation while watching the video output on the terminal. This is described with reference to FIG. 1.

For example, as illustrated in FIG. 1, if a terminal 100 and an external device 200 are connected by MHL, the external device 200 may output or otherwise display a video the same as the video being output by the terminal 100.

At this point, if a user desires to select a specific application while watching a video being output in the external device 200, since a position of an electronic pen 110 or a finger of the user (not illustrated) is not displayed on the external device 200, the user may not select the application by looking at the external device 200.

Therefore, the user must select the application to be executed by looking at the terminal 100, and this inconveniences the user to look at both of the terminal 100 and the external device 200, alternately.

SUMMARY

Accordingly, the present disclosure provides a method that enables a pointer to be displayed on an external device, when an output video is shared between a terminal and the external device.

In order to accomplish this object, an embodiment of the present disclosure provides a method of controlling display of a pointer by a terminal so that the pointer is displayed on an external device. The method includes transmitting an output video of the terminal to the external device; detecting a sensing value with an input unit according to a input performed on a display area; generating a pointer displaying signal used for displaying a pointer on the external device at a position corresponding to a position where the detected sensing value is detected based on the detected sensing value; and transmitting the generated pointer displaying signal to the external device.

Meanwhile, another aspect provides a method of displaying a pointer on an external device while outputting a video received from a terminal. The method includes outputting a video received from the terminal on a display area; determining a position of the pointer to be displayed on the display area based on a pointer displaying signal received from the external device during output of the video; and displaying the pointer on the determined position.

Meanwhile, another aspect provides an apparatus that controls display of a pointer by a terminal so that the pointer is displayed on an external device. The apparatus includes a communicating unit that performs a communication with the external device; an input and output unit that outputs a video and detect a sensing value according to a input; and a controller that transmits an output video of the terminal which is being output through the input and output unit to the external device through the communicating unit, generates a pointer displaying signal to be used for displaying the pointer at a position corresponding to a position on the external device where the sensing value is detected based on the sensing value received from the input and output unit, and transmits the generated pointer displaying signal through the communicating unit to the external device.

Meanwhile, another aspect provides an apparatus that displays a pointer on an external device currently outputting a video received from a terminal. The apparatus includes a communicating unit that performs a communication with a terminal; an output unit that outputs a video; and a controller that outputs a video received from the terminal via the communicating unit through the output unit, determines a position of the pointer to be displayed on the output unit based on a pointer displaying signal received from the external device via the communicating unit during output of the video, and then displays the pointer on the determined position.

The pointer is preferably displayed on an external device that shares an output video with a terminal, so the user may execute a desired function by looking at only the external device without looking at the terminal.

BRIEF DESCRIPTION OF THE DRAWINGS

The above and other aspects, features, and advantages of the present invention will be more apparent from the following detailed description taken in conjunction with the accompanying drawings, in which:

FIG. 10A, FIG. 10B, FIG. 10C and FIG. 10D are diagrams illustrating methods of displaying pointers according to an embodiment of the present invention;

FIG. 11A, FIG. 11B, FIG. 11C, FIG. 11D, FIG. 11E and FIG. 11F are diagrams illustrating methods of displaying pointers according to another embodiment of the present invention.

DETAILED DESCRIPTION

Hereinafter, in the following description of the present invention, a detailed description of known functions and configurations incorporated herein will be omitted when it may make the subject matter of the present invention rather unclear.

As described above, while the terminal and the external device output the same video, a user who watches the video via the external device does not know at which point of the output video being output a finger or an input unit such as an electronic pen is positioned, and therefore the user may not be able to execute a specific application or select a menu having a specific function, via the external device.

Therefore, in preferred embodiments the present invention provides a method that enables a user to execute a specific application or select a menu having a specific function, only through the external device, by displaying a pointer indicating a present position of the input unit on the external device.

Hereinafter, embodiments of the present invention will be described with reference to the accompanying drawings.

Figure 1:
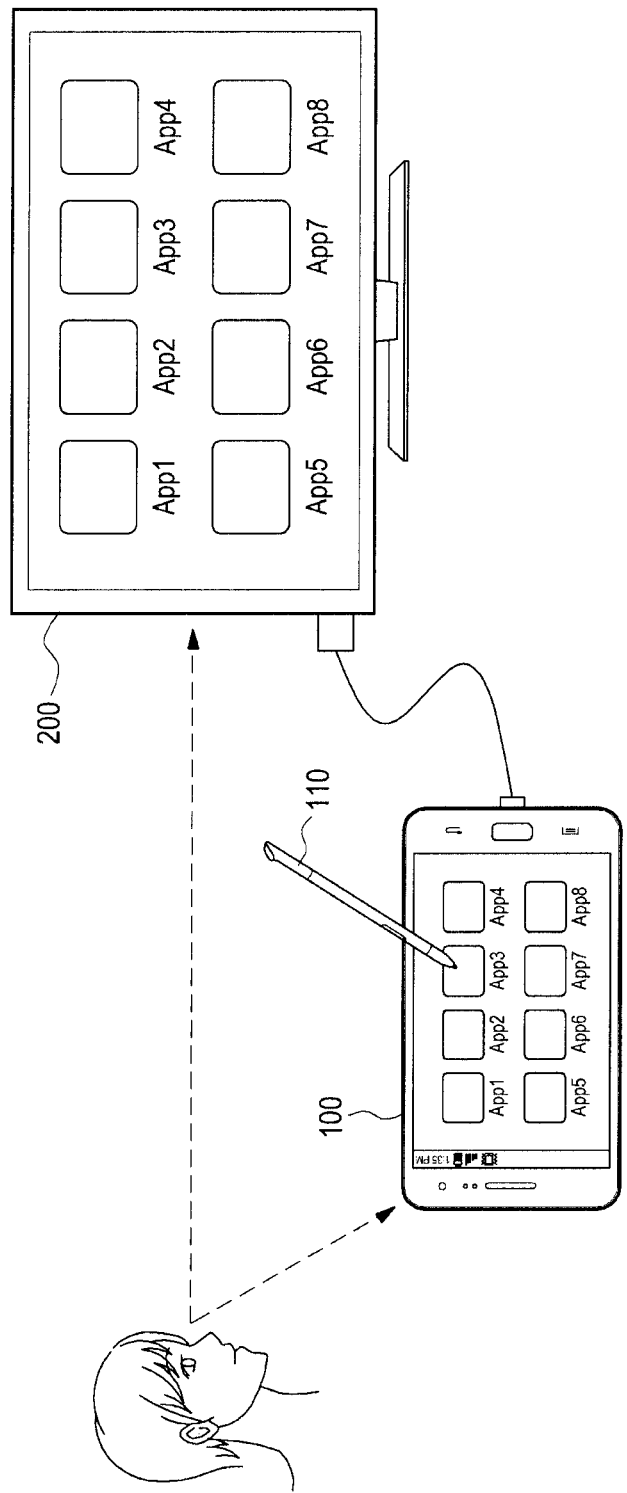
FIG. 1 is a diagram illustrating a problem according to the conventional art.
Figure 2:
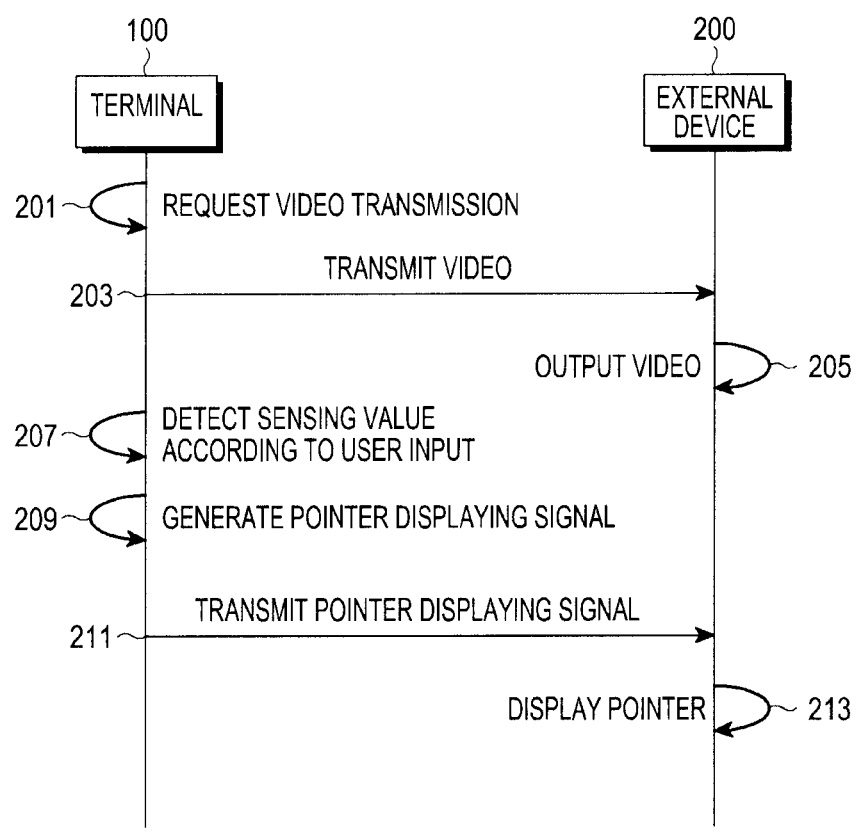
FIG. 2 is a sequence diagram illustrating a concept of a method of displaying a location of a pointer according to an embodiment of the present invention.

One embodiment of a method of displaying a location of a pointer according to the embodiment of the present invention will be described with reference to FIG. 2.

In step 201, when a terminal 100 receives a video transmission request, the terminal 100 proceeds to step 203 to transmit a requested video to an external device 200. Here, the video transmission request preferably refers to a request to transmit a video which is being output by the terminal 100, to the external device 200.

In step 205, the external device 200 outputs a video received from the terminal 100. Typically, the external device 200 continuously receives the video from the terminal 100 and is being output the video, rather than having the video information being transmitted by the terminal 100 and cached in memory of the external device 200 for display.

In step 207, the terminal 100 detect a sensing value according to input (e.g., user input) on a display area. The sensing value may be a sensing value with respect to any one of capacitance, magnetic field, and pressure, and preferably the sensing value corresponds to a particular location of pointer or selection device on the display area.

In step 209, the terminal 100 generates a pointer displaying signal to be used for indicating a pointer on the external device 200 based on the detected sensing value, and then the process proceeds to step 211. The pointer displaying signal is typically a signal to indicate the pointer on a display area of the external device 200 corresponding to a position where the sensing value is detected, and includes coordinate information at a position where the sensing value has been sensed. Even though the invention is generally described with the terminal 100 detecting contact between the pointer and the terminal 100, it is understood that such contact can actually be without direct contact, e.g., the two devices being within a small distance, e.g., 5-10 mm.

In step 211, the terminal 100 transmits the generated pointer displaying signal to the external device 200.

In step 213, the external device 200 analyzes the pointer displaying signal received from the terminal 100 and displays the pointer on the display area based on the analyzed result. That is, the external device 200 indicates the pointer at a position corresponding to the user input of the terminal 100.

According to the embodiment as described above, since the position of the input unit, that is, the position of a finger of the user or an electronic pen, is displayed on the external device 200, the user may execute a specific application or select a menu having a specific function without looking at the terminal 100.

In the above, the concept of the method of displaying the point according to the embodiment of the present invention has been described with reference to FIG. 2. Hereinafter, embodiments of the present invention will be described in detail with reference to corresponding drawings.

Figure 3:
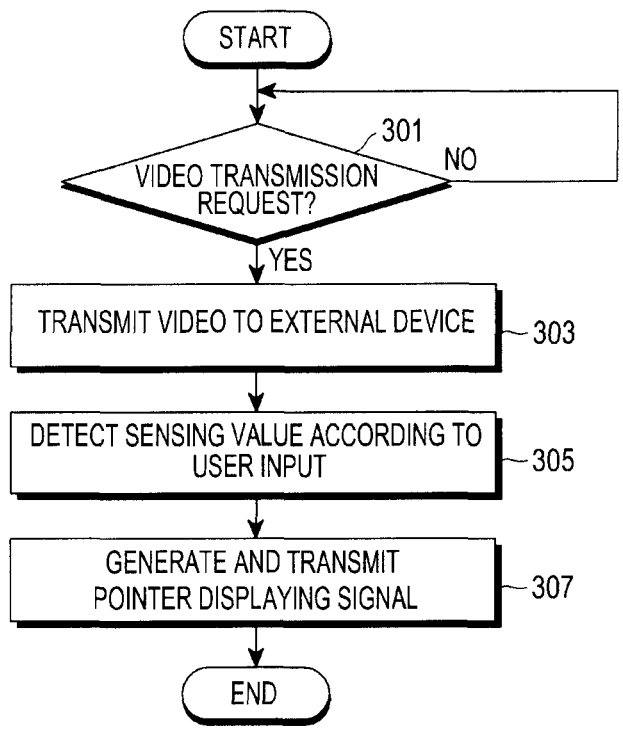
FIG. 3 is a flowchart illustrating a method of controlling display of the pointer in a terminal according to embodiments of the present invention.

FIG. 3 is a flowchart illustrating a method of controlling display of a pointer in a terminal according to embodiments of the present invention.

In step 301, the terminal determines whether the video transmission request to an external device exists, and if the video transmission request to the external device exists, a terminal proceeds to step 303. Here, the video transmission request refers to a request to transmit a video which is being output by the terminal to the external device. The request may be automatically performed when a session with the external device has been established, for example, by using various communication technologies. For example, when an MHL transmission cable has been connected between the terminal and the external device to establish a session between the terminal and the external device, or when a Wi-Fi P2P session between the terminal and the external device has been established, it may be assumed that such request has been made. Otherwise, when the user selects a specific menu after the establishment of the session with the external device, it may be assumed that such request has been made.

Although the invention is described as being used in combination with an MHL transmission cable and Wi-Fi P2P, the invention is not limited to such transmission technologies or protocols. For example, any other type of transmission system is acceptable, including, but not limited to the presently existing Bluetooth, Ethernet, 802.11a/b/g/n/ac, as well as cellular communication technologies or any future developed wired or wireless communication system capable of handling the video as well as the pointer displaying signal.

In step 303, after the terminal transmits the video that the terminal is currently being output, to the external device, the terminal proceeds to step 305. In the following steps, it is assumed that the video that is currently being output from the terminal is continuously transmitted to the external device. Meanwhile, in step 303, the terminal may change its own state of display. For example, the terminal may reduce power consumption by reducing the brightness of the output video or by cutting off power supply for displaying the output video.

In step 307, the terminal detects a sensing value with respect to the user input from the display area. The sensing value may be a sensing value with respect to any one of capacitance, magnetic field, and pressure.

In step 307, the terminal generates a pointer displaying signal based on the detected sensing value, and transmits the generated pointer displaying signal to the external device. In generating the pointer displaying signal, the terminal compares the detected sensing value with a predetermined threshold value and generates the pointer displaying signal if the sensing value is equal to or greater than the predetermined threshold value. By using the predetermined threshold value, many inadvertent or unintentional sensed sensing values can be ignored.

In the above, the operation in the terminal according to an embodiment of the present invention has been described with reference to FIG. 3. Hereinafter, an operation in the external device according to an embodiment of the present invention will be described in detail with reference to corresponding drawings.

Figure 4:
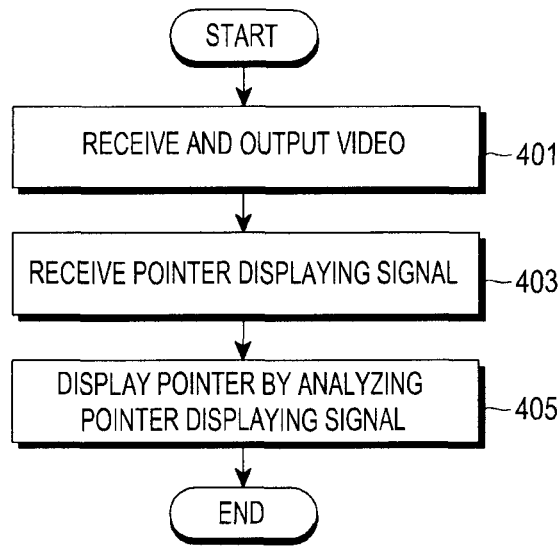
FIG. 4 is a flowchart illustrating a method of displaying a pointer in an external device according to an embodiment of the present invention.

FIG. 4 is a flowchart illustrating a method of displaying a pointer in an external device according to an embodiment of the present invention.

In step 401, the external device outputs or displays a video received from a terminal. At this point, the video received from the terminal is a video which is currently being output by the terminal, and, in the following steps, it is assumed that the external device continuously receives and outputs the video currently being output on the terminal. Meanwhile, the external device may adjust the size of the video in accordance with its own resolution in outputting the video received from the terminal.

In step 403, the external device receives the pointer displaying signal from the terminal, and the external device proceeds to step 405.

In step 405, the external device analyzes the pointer displaying signal received from the terminal, and displays the pointer based on the analysis result. That is, the external device determines at which point of the display area the pointer is to be displayed and displays the pointer based on the determination.

In the above, a method of displaying the pointer on the external device according to an embodiment of the present invention has been described with reference to FIGS. 3 and 4. Examples according to the method will be described with reference to FIGS. 5A and 5B.

Figure 5A:
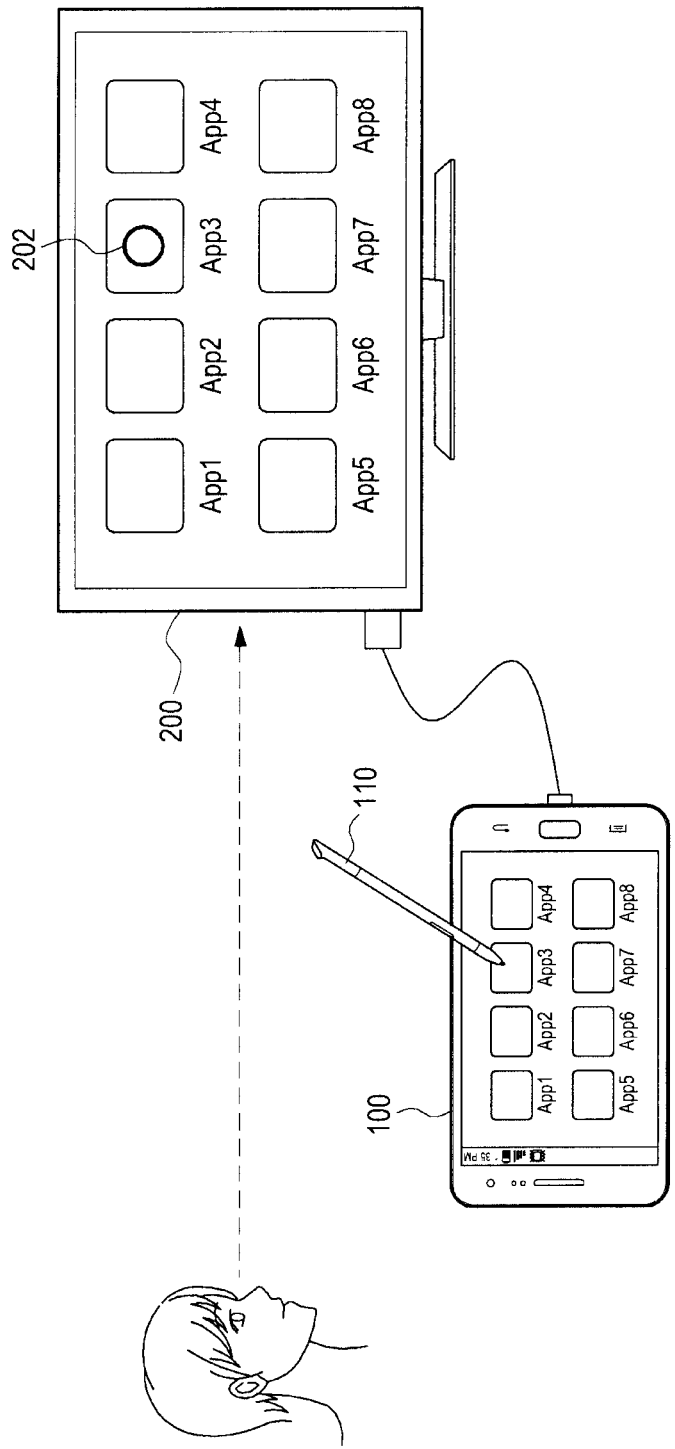
FIG. 5A and FIG. 5B are diagrams illustrating methods of displaying the pointer according to an embodiment of the present invention.

FIG. 5A is a diagram illustrating a case in which a user executes a specific application App3 using an electronic pen 110, while a video is being output on both of a terminal 100 and an external device 200. When the user positions the electronic pen 110 at a specific position of the terminal 100, a pointer 202 indicating the position of the electronic pen 110 is displayed on the external device 200. Therefore, the user may know the position of the electronic pen 110 without looking at the terminal 100. In addition, if the pointer is displayed on an icon corresponding to the application App3 that the user desires to execute, the user may select and execute the corresponding application App3.

Figure 5B:
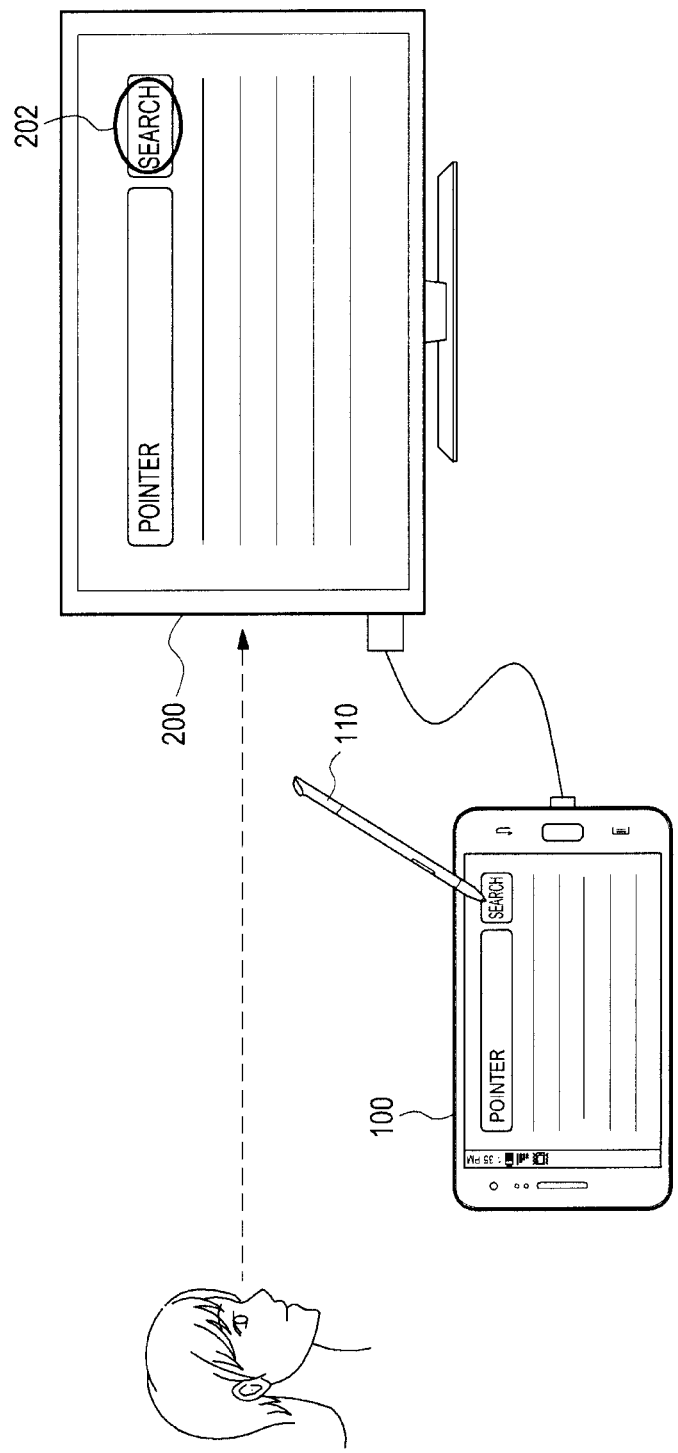

FIG. 5B is a diagram illustrating a case in which the user selects a specific menu by using the electronic pen 110 while the video is being output on both of the terminal 100 and the external device 200. As described with reference to FIG. 5A, since the pointer 202 indicating the current position of the electronic pen 110 is displayed on the external device 200, the user may know the current position of the electronic pen 110 only by looking at the external device 200, and accordingly the user may execute the corresponding function by selecting the menu to perform the specific function.

In the above, the method of displaying the pointer on the external device 200 according to an embodiment of the present invention has been described with reference to FIGS. 3 to 5. Hereinafter, a method of displaying a pointer on the external device 200 according to another embodiment of the present invention will be described with reference to the corresponding drawings.

Figure 6:
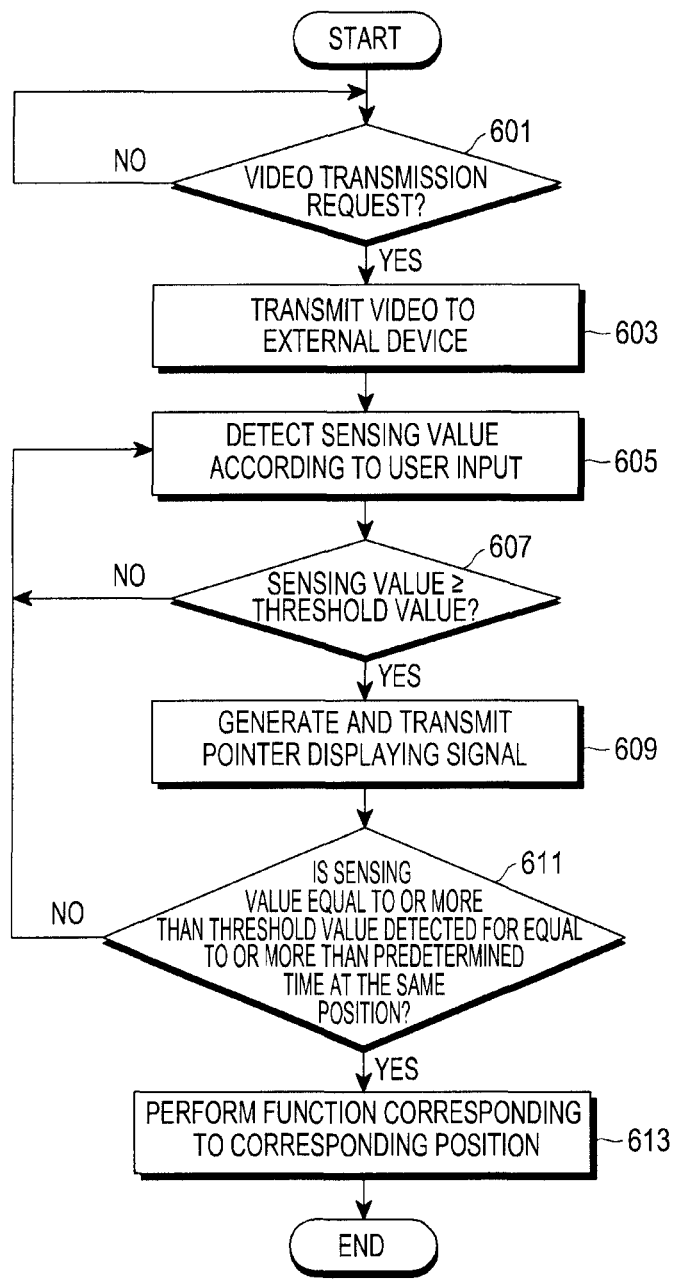
FIG. 6 is a flowchart illustrating a method of controlling display of a pointer according to another embodiment of the present invention.

FIG. 6 is a flowchart illustrating a method of controlling display of a pointer according to another embodiment of the present invention.

Since steps 601 to 605 are the same as steps 401 to 405 described with reference to FIG. 4, the detailed description thereof will not be provided here.

In step 607, a terminal determines whether a sensing value detected by user input is equal to or more than a predetermined threshold value. The terminal proceeds to step 609 only if the detected sensing value is equal to or more than the predetermined threshold value, and otherwise, the terminal proceeds to step 605.

In step 609, the terminal generates a pointer displaying signal, transmits the generated pointer displaying signal to an external device, and proceeds to step 611.

In step 611, the terminal determines whether the sensing value equal to or more than the threshold value is detected for the predetermined time or more at the same position. The terminal proceeds to step 613 only if the sensing value is equal to or more than the threshold value is detected for the predetermined time or more at the same position, or otherwise the returns to step 605.

In step 613, the terminal performs a function corresponding to the position where the detected sensing value is detected. For example, if an icon of a specific application is displayed at a position where the sensing value is detected, the corresponding application is performed, or if a menu for performing a specific function is displayed at a position where the sensing value is detected, the corresponding function is performed.

In the above, the method of generating the pointer displaying signal or performing the specific function by using one threshold value has been described with reference to FIG. 6. Hereinafter, a method of generating the pointer displaying signal or performing the specific function by using two threshold values will be described.

Figure 7:
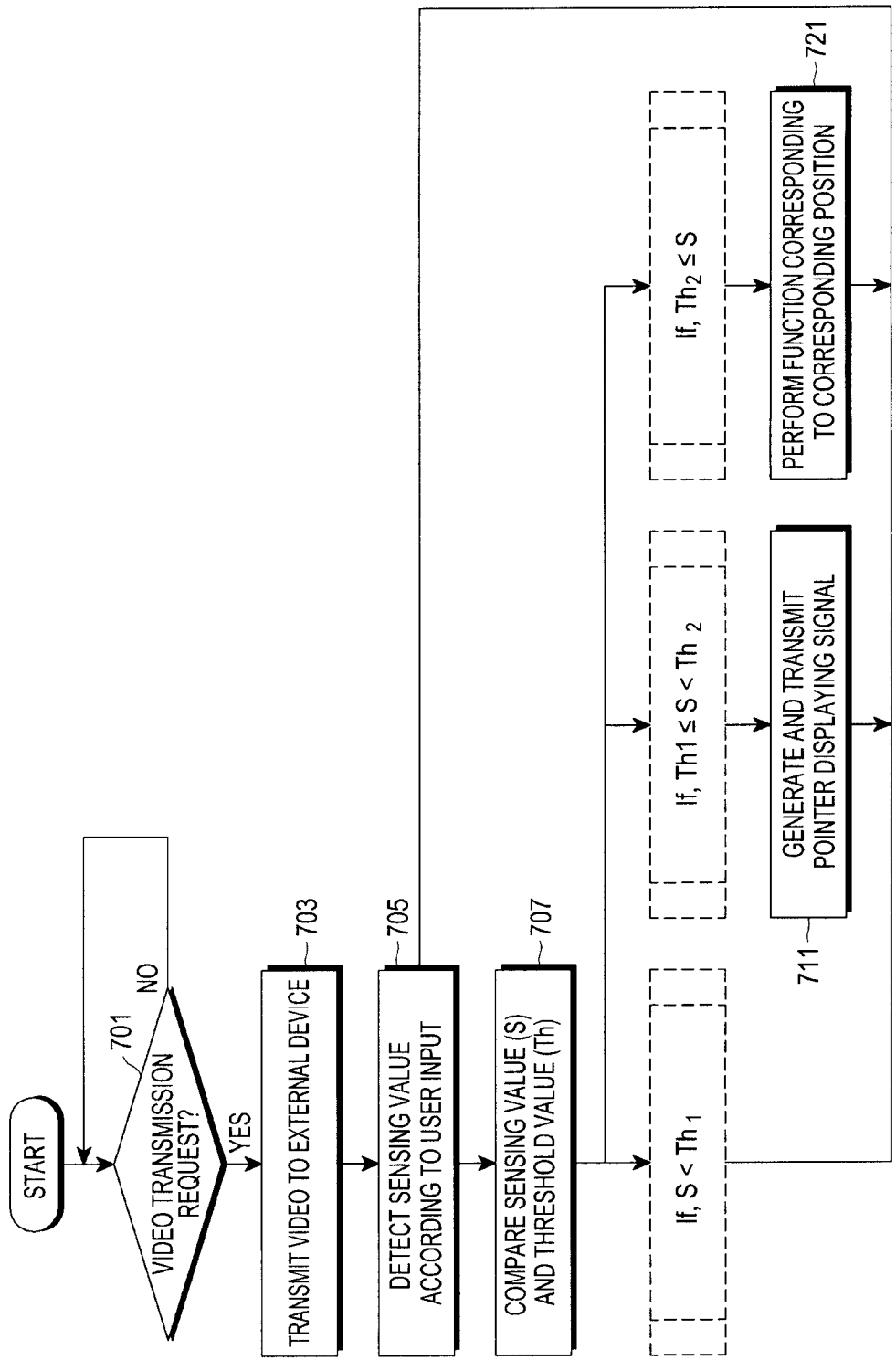
FIG. 7 is a flowchart illustrating a method of controlling display of a pointer according to another embodiment of the present invention.

FIG. 7 is a flowchart illustrating a method of controlling display of a pointer according to another embodiment of the present invention.

Since steps 701 to 705 are the same as steps 401 to 405 as described with reference to FIG. 4, the detailed description thereof will not be provided here.

In step 707, the terminal compares an detected sensing value S and predetermined threshold values $Th_1$ and $Th_2$.

If it is determined that the detected sensing value is S less than the first threshold value $Th_1$ based on the determination result in step 707, the terminal performs no function and proceeds to step 705.

Meanwhile, if it is determined that the detected sensing value is equal to or more than the first threshold value $Th_1$ and less than the second threshold value $Th_2$ based on the determination result in step 707, the terminal proceeds to step 711 in which the terminal generates a pointer displaying signal, transmits the generated pointer displaying signal to the external device, and then proceeds to step 705.

Meanwhile, if it is determined that the detected sensing value is equal to or more than the second threshold value $Th_2$ based on the determination result in step 707, the terminal proceeds to step 721, in which the terminal performs a function corresponding to the position where the sensing value is detected, and then proceeds to step 705. That is, in step 721, the terminal executes a specific application or performs a function corresponding to the corresponding position, and then proceeds to step 705. More particularly, in this embodiment, if the sensing value is less than $Th_1$, the input is ignored, if the sensing value is between $Th_1$ and $Th_2$, the pointer is displayed, but no action is taken. Only if the sensing value is greater than $Th_1$ is the function performed.

The embodiment with reference to FIG. 7 has been described under the assumption that a pointer in the same type is displayed regardless of a duration of user input. Pointers may be displayed in different types according to the duration of user input depending on embodiments. This will be described with reference to FIG. 8.

Figure 8:
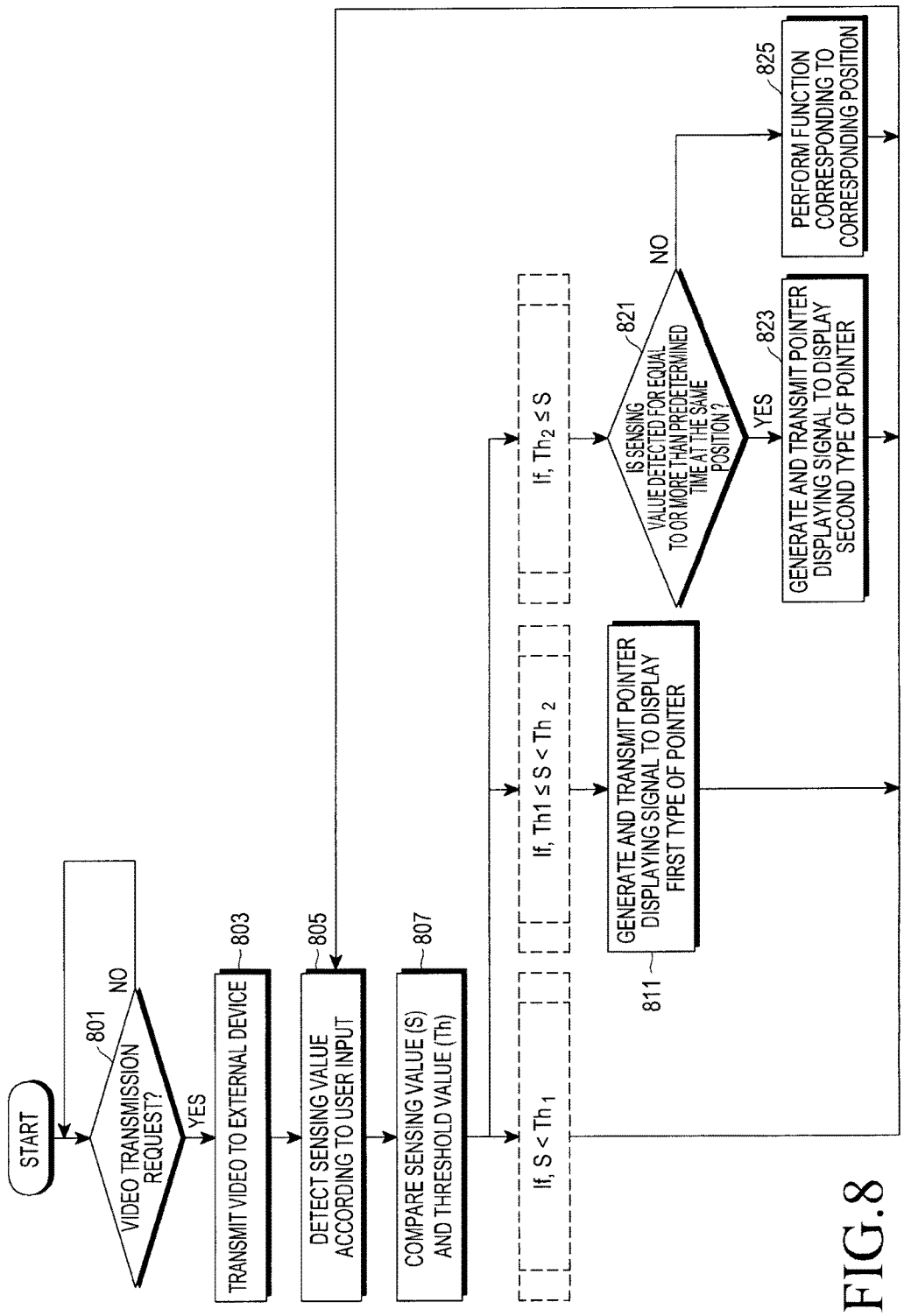
FIG. 8 is a flowchart illustrating a method of controlling display of a pointer according to another embodiment of the present invention.

FIG. 8 is a flowchart illustrating a method of controlling display of a pointer according to another embodiment of the present invention.

Since steps 801 to 805 of FIG. 8 are the same as steps 401 to 405 described with reference to FIG. 4, the detailed description thereof will not be provided.

In step 807, the terminal compares the detected sensing value with the predetermined threshold values $Th_1$ and $Th_2$.

If it is determined that the detected sensing value is equal to or more than the predetermined first threshold value $Th_1$, and lower than the predetermined second threshold value $Th_2$ based on the determination result in step 807, the terminal proceeds to step 811, in which the terminal generates a pointer displaying signal to display a first type of pointer, transmits the generated pointer displaying signal to the external device, and then proceeds to step 805.

If it is determined that the detected sensing value is equal to or more than the predetermined second threshold value $Th_2$ based on the determination result in step 807, the terminal proceeds to step 821, in which the terminal determines whether the detected sensing value is continuously detected at the same position for longer than a predetermined time.

If it is determined that the sensing value which is equal to or more than the second threshold value $Th_2$ is detected at the same position for equal to or longer than the predetermined time based on the determination result in step 821, the terminal proceeds to step 823, in which the terminal generates a pointer displaying signal to display a second type of pointer, transmits the generated pointer displaying signal to the external device, and then proceeds to step 805.

Here, the second type of pointer refers to a pointer which is different from the first type of pointer in at least one of shape, color, opacity or size. Therefore, according to the present embodiment of the present invention, the pointer displaying signal includes information with respect to a position where the pointer is to be displayed and information with respect to a type of pointer.

Meanwhile, if it is determined that the sensing value which is equal to or more than the second threshold value $Th_2$ is detected at the same position for shorter than the predetermined time based on the determination result in step 821, the terminal proceeds to step 825, in which the terminal performs a function corresponding to the corresponding position, and proceeds to step 805. More particularly, the function is performed only when the sensing value is detected for a time less than the predetermined time. This embodiment allows for situations when the first type of pointer, as initially displayed on the external device, is not visualized by the user (e.g., obscured by the background image or the displayed pointer does not have enough contrast) or when the sensing value, although correctly measured by the terminal, was inadvertent.

According to the embodiment, the terminal may perform the function corresponding to the corresponding position in step 823, and generate the pointer displaying signal to display the second type of pointer in step 825.

In the above, the method of controlling the display of a pointer and the method of displaying the pointer have been described with reference to FIGS. 2 to 8. Hereinafter, structures of the terminal and the external device to which the embodiments of the present invention are applied will be described with reference to the corresponding drawings.

Figure 9:
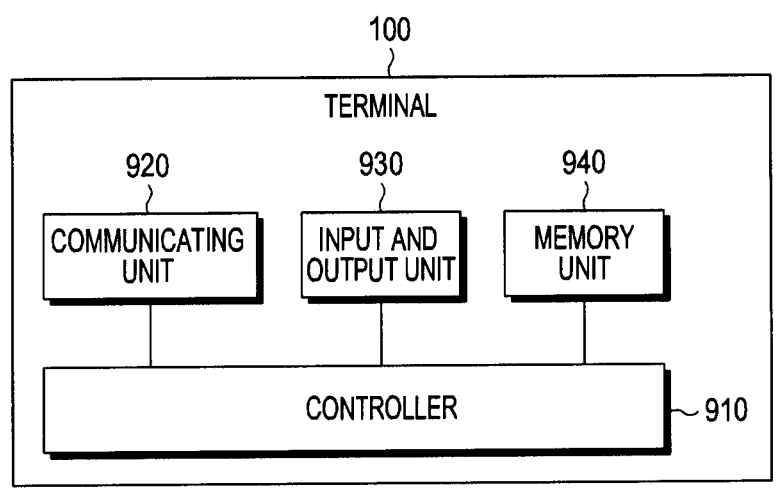
FIG. 9 is a block diagram illustrating a terminal to which embodiments of the present invention are applied.

FIG. 9 is a block diagram illustrating a typical terminal to which embodiments of the present invention may be applied.

With reference to FIG. 9, the terminal to which the embodiments of the present invention are applied typically includes a controller 910, a communicating unit 920, and an input and output unit 930. The terminal 100 may further include a memory unit 940, depending on the embodiment.

If a predetermined request is made, the controller 910 transmits its own output video which is being output through an input and output unit 930 to the external device via the communicating unit 920. If a selection of a predetermined menu by a user is made or a session with the external device is established, the controller 910 may determine that the predetermined request has been made. Meanwhile, the transmission of the output video may be continued until a specific interruption, such as a selection of a predetermined menu or release of the session, is generated.

The controller 910 generates the pointer displaying signal used for displaying a pointer on the external device based on a sensing value received from the input and output unit 930, and transmits the generated pointer displaying signal through the communicating unit 920 to the external device. The sensing value may be at least one of capacitance, a magnetic field and pressure.

In an embodiment, the controller 910 compares the sensing value received from the input and output unit 930 with the predetermined threshold value, and generates a pointer displaying signal if the sensing value is more than the predetermined threshold value. At this point, the controller 910 may perform the function corresponding to the corresponding position when the sensing value which is equal to or more than the predetermined threshold value is detected at the same position for equal to or more than a predetermined time. For example, when an icon indicating a specific application exists at the corresponding position, the controller 910 may execute the corresponding application. Otherwise, when a menu to perform a specific function may be displayed at the corresponding position, the controller 910 may perform a function corresponding to the corresponding menu.

The embodiments will be described with reference to FIGS. 10A to 10D as follows.

Figure 10A:
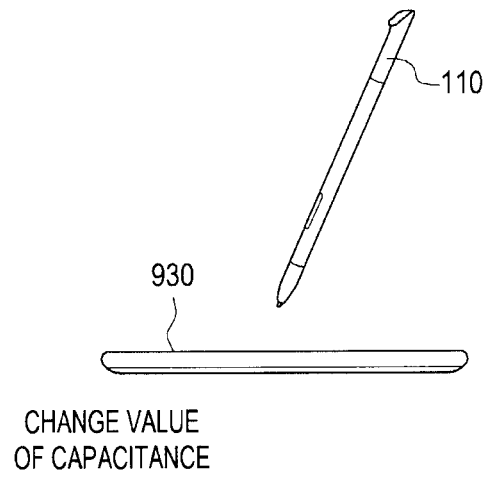
Figure 10A:
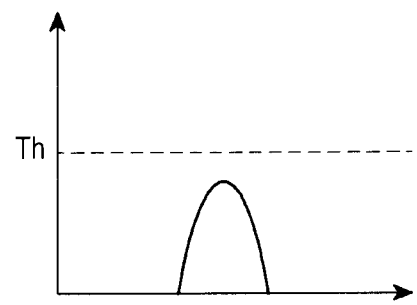
Figure 10A:
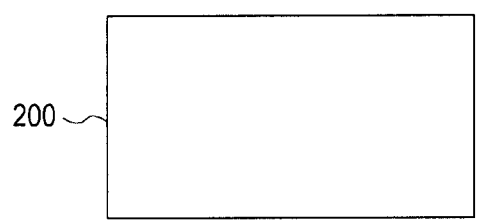
Figure 10B:
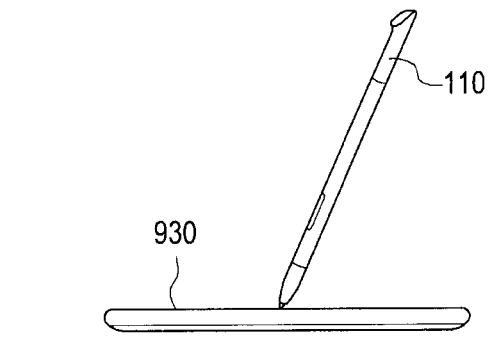
Figure 10B:
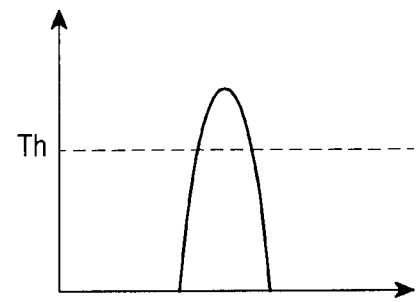
Figure 10B:
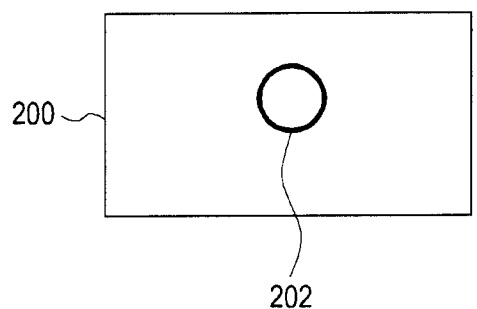

FIGS. 10A and 10B are diagrams illustrating embodiments of using a change of capacitance values, and FIGS. 10C and 10D are diagrams illustrating embodiments of using pen pressure. As illustrated in FIGS. 10A and 10C, if a sensing value detected in the input and output unit 930, that is, a change amount of the capacitance or the pen pressure, is smaller than a predetermined threshold value Th, the terminal does not generate a pointer displaying signal, so no pointer is displayed on the external device 200. In addition, as illustrated in FIGS. 10B and 10D, if a sensing value detected in the input and output unit 930, that is, a change amount of the capacitance or the pen pressure, is larger than the predetermined threshold value Th, the terminal generates a pointer displaying signal and transmits the generated pointer displaying signal so that a pointer 202 is displayed on the external device 200. If a sensing value equal to or more than the threshold value Th is detected at the same position for equal to or longer than the predetermined time, the terminal performs a function corresponding to the corresponding position.

In another embodiment, the controller 910 may compare a sensing value received from the input and output unit 930 with the predetermined first and second threshold values, and generate a pointer displaying signal to display a first type of pointer if the sensing value is equal to or more than the predetermined first threshold value and less than the predetermined second threshold value. In addition, the controller 910 may generate a pointer displaying signal to display a second type of pointer or a function corresponding to the corresponding position if the sensing value is equal to or more than the predetermined second threshold value. Further, if the sensing value is equal to or more than the predetermined second threshold value, the controller 910 may determine whether the sensing value is detected in the same position for equal to or longer than a predetermined time, and generate a pointer displaying signal to display a second type of pointer if the sensing value is detected in the same position for equal to or longer than the predetermined time. Here, the second type of pointer may be a pointer which is different from the first type of pointer in at least one of shape, color, or opacity.

The embodiments are described with reference to FIGS. 11A to 11D as follows.

FIGS. 11A to 11C are diagrams illustrating an embodiment of using a change of capacitance values, and FIGS. 11D to 11F are diagrams illustrating an embodiment of using pen pressure. As illustrated in FIGS. 11A and 11C, if a sensing value detected in the input and output unit 930, that is, a change amount of the capacitance or the pen pressure, is smaller than a predetermined first threshold value Th1, the terminal does not generate a pointer displaying signal, so no pointer is displayed on the external device 200. In addition, as illustrated in FIGS. 11B and 11D, if a sensing value detected in the input and output unit 930, that is, a change amount of the capacitance or the pen pressure, is equal to or larger than the predetermined first threshold value Th1 and smaller than a predetermined second threshold value Th2, the terminal generates a pointer displaying signal to display a first type of pointer and transmits the generated pointer displaying signal to the external device, so the first type of pointer 202 is displayed on the external device 200. As illustrated in FIGS. 11C and 11D, if a sensing value detected in the input and output unit 930, that is, a change amount of the capacitance or the pen pressure, is equal to or larger than the predetermined second threshold value Th2, the terminal generates a pointer displaying signal to display a second type of pointer and transmits the generated pointer displaying signal to the external device, so the second type of pointer 202 is displayed on the external device 200. In addition, if a sensing value equal to or more than the second threshold value Th2 is detected on the same position for equal to or longer than a predetermined time, the terminal performs a function corresponding to the corresponding position. According to the embodiment, if a sensing value equal to or more than the second threshold value Th2 is detected on the same position for equal to or longer than the predetermined time, the terminal performs a function corresponding to the corresponding position, and if a sensing value equal to or more than the second threshold value Th2 is detected on the same position for shorter than the predetermined time, the terminal may generate and transmit a pointer displaying signal to display the second type of pointer.

Meanwhile, the controller 910 may change the display state of the input and output unit 930 while the output video is transmitted to the external device 200. For example, the controller 910 may lower the brightness of the output video, or cut off power supply for display of the output video.

The communicating unit 920 performs a communication with the external device by various communication methods, for example, MHL or Wi-Fi P2P, under the control of the controller 910. Further, the communicating unit 920 transmits the video currently being output and the pointer displaying signal to the external device under the control of the controller 910.

The input and output unit 930 may include a displaying unit that displays an output video and a separate sensing unit that senses input by a user. The sensing unit may use a unit that senses at least one of capacitance, magnetic field, and pressure.

The memory unit 940 may be used to store, e.g., the threshold values to be compared with the sensing value.

In the above, a description is made of the terminal to which the embodiments of the present invention is applied, with reference to FIG. 9. Hereinafter, a description will be made of the external device to which the embodiments of the present invention are applied with reference to FIG. 12.

Figure 12:
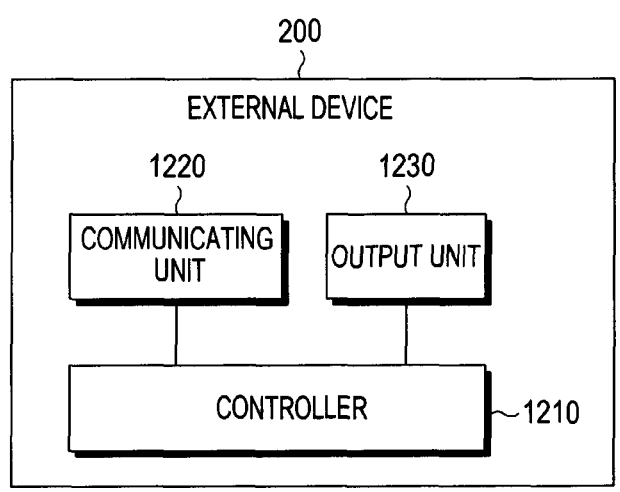
FIG. 12 is a block diagram illustrating an external device to which embodiments of the present invention are applied.

FIG. 12 is a block diagram illustrating an external device to which a subset of embodiments of the present invention may apply.

With reference to FIG. 12, the external device to which the embodiments of the present invention are applied includes a controller 1210, a communicating unit 1220, and an output unit 1230.

The controller 1210 outputs a video through the output unit 1230, which is received from the terminal via the communicating unit 1220, determines the position of a pointer displayed on the output unit 1230 based on the pointer displaying signal received from the terminal through the communicating unit 1220 while the video is being output, and then displays the pointer on the determined position. At this point, the controller 1210 may further determine the type of pointer to be displayed on the output unit based on the pointer displaying signal.

The communicating unit 1220 performs a communication with the terminal by various communication methods, for example, MHL or Wi-Fi P2P, under the control of the controller 1210. Further, the communicating unit 1220 displays the pointer on the video currently being output under the control of the controller 1210.

Under the control of the controller 1210, the output unit 1230 outputs the video received from the terminal and displays the pointer.

Embodiments of the present invention described above may be implemented any of various methods. For example, embodiments of the present invention may be implemented by combinations of hardware and, software. When the embodiments of the present invention are implemented utilizing software, the software may be executed on one or more processors using various operating systems and platforms. In addition, such software may be prepared using any programming languages out of a plurality of appropriate programming languages, and may be compiled to executable machine language codes or intermediate codes that are executed on a framework or a virtual machine.

The above-described methods according to the present invention can be implemented in hardware, firmware or via the execution of software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101 and none of the elements consist of software per se.

Further, when the embodiments of the present invention are executed on one or more processors, the embodiments may be implemented by a processor-readable medium (for example, a memory, a floppy disc, a hard disc, a compact disc, an optical disc, or a magnetic tape) which stores one or more programs that perform methods of implementing various embodiments of the present invention discussed above.

What is claimed is:

1. A method of controlling display of a pointer by a terminal so that the pointer is displayed on an external device, the method comprising:
    displaying an image on a touch screen of the terminal
    transmitting the image to the external device to be displayed on a display of the external device, while displaying the image on the touch screen of the terminal;
    detecting a sensing value according to a touch input in the image displayed on the touch screen of the terminal, wherein the touch input is input at a first position in the image displayed on the touch screen, wherein the sensing value includes coordinate information at the first position where the touch input is detected;
    generating a pointer displaying signal to display the pointer at a position corresponding to the first position in the image displayed on the display of the external device based on the sensing value; and
    transmitting the pointer displaying signal to the external device so that the pointer is displayed at the position corresponding to the first position in the image displayed on the display of the external device, wherein the pointer is displayed at the position determined by resolution of the external device based on the coordinate information.

2. The method according to claim 1, wherein at least one of the image and the pointer displaying signal is transmitted using MHL (Mobile High-definition Link) or Wi-Fi P2P (Peer to Peer).

3. The method according to claim 1, wherein the detecting the sensing value comprises collecting data corresponding to both the first position of the input and the sensing value.

4. The method according to claim 1, wherein the sensing value is at least one of capacitance, a magnetic field, and pressure.

5. The method according to claim 1, wherein generating the pointer displaying signal comprises:
    generating the pointer displaying signal when the detected sensing value is at least a predetermined threshold value.

6. The method according to claim 5, further comprising:
    performing a function related to the corresponding position of the pointer, when the sensing value which is at least the predetermined threshold value is detected at a same position for at least a predetermined time.

7. The method according to claim 1, wherein generating the pointer displaying signal comprises:
    generating a pointer displaying signal to display a first type of pointer, when the detected sensing value is at least a predetermined first threshold value, and less than a predetermined second threshold value.

8. The method according to claim 7, wherein generating the pointer displaying signal comprises:
    determining whether the detected sensing value is detected at a same position for at least a predetermined time when the detected sensing value is at least the predetermined second threshold value, and
    generating a pointer displaying signal to display a second type of pointer when the detected sensing value is detected at a same position for at least the predetermined time.

9. The method according to claim 8, wherein the second type of pointer is a pointer which is different from the first type of pointer in at least one of shape, color, or opacity.

10. The method according to claim 8, further comprising:
    performing a function related to the corresponding position of the pointer, when the detected sensing value is detected on the same position for less than the predetermined time.

11. The method according to claim 1, further comprising:
    changing a display state of the terminal when transmission of the image to the external device is initiated.

12. The method according to claim 11, wherein changing the display state of the terminal comprises changing a brightness of the image.

13. The method of claim 1, further comprising:
    performing a function related to the corresponding position of the pointer, when the detected sensing value is detected at a same position for less than a predetermined time.

14. An apparatus that controls display of a pointer by a terminal so that the pointer is displayed on an external device; comprising:
    a communicating unit configured to perform a communication with the external device;
    a touch screen configured to display an image and detect a sensing value according to a touch input in the image displayed on the terminal, wherein the touch input is input at a first position in the image displayed on the touch screen; and
    a controller configured to transmit the image to the external device to be displayed on a display of the external device, through the communicating unit, while displaying the image on the terminal, to generate a pointer displaying signal to display the pointer at a position corresponding to the first position in the image displayed on the display of the external device based on the sensing value, and to transmit the pointer displaying signal, through the communicating unit, to the external device so that the pointer is displayed at the position corresponding to the first position in the image displayed on the display of the external device, wherein the sensing value includes coordinate information at the first position where the touch input is detected, and wherein the pointer is displayed at the position determined by resolution of the external device based on the coordinate information.

15. The apparatus according to claim 14, wherein at least one of the image and the pointer displaying signal is transmitted using MHL (Mobile High-definition Link) or Wi-Fi P2P (Peer to Peer).

16. The apparatus according to claim 14, wherein the controller is configured to collect data corresponding to both the first position of the input and the sensing value.

17. The apparatus according to claim 14, wherein the sensing value is at least one of capacitance, a magnetic field, and pressure.

18. The apparatus according to claim 14, wherein the controller is configured to generate the pointer displaying signal when the detected sensing value is at least a predetermined threshold value.

19. The apparatus according to claim 18, wherein the controller is adapted to perform a function corresponding to the corresponding position, when the sensing value which is at least the predetermined threshold value is detected at a same position for at least a predetermined time.

20. The apparatus according to claim 14, wherein the controller is configured to generate a pointer displaying signal to display a first type of pointer, when the detected sensing value is at least predetermined first threshold value, and less than a predetermined second threshold value.

21. The apparatus according to claim 20, wherein the controller is configured to determine that the detected sensing value is detected at a same position for at least a predetermined time when the detected sensing value is at least the predetermined second threshold value, and to generate a pointer displaying signal to display a second type of pointer when the detected sensing value is detected at a same position for at least the predetermined time.

22. The apparatus according to claim 21, wherein the second type of pointer is a pointer which is different from the first type of pointer in at least one of shape, color, or opacity.

23. The apparatus according to claim 21, wherein the controller is configured to perform a function related to the corresponding position, when the detected sensing value is detected on the same position for less than the predetermined time.

24. The apparatus according to claim 14, wherein the controller is adapted to change a display state of the terminal when transmission of the image to the external device is initiated.

25. The apparatus according to claim 24, wherein the controller is adapted to change the display state of the terminal by changing the brightness of the image.

* * * * *